United States Patent
Wang et al.

(10) Patent No.: US 6,912,930 B2
(45) Date of Patent: Jul. 5, 2005

(54) FLEX SPLINE FOR MESHING TYPE GEAR DEVICE, AND MESHING TYPE GEAR DEVICE HAVING FLEX SPLINE

(75) Inventors: Hongyou Wang, Mie (JP); Toshio Yoshikawa, Mie (JP)

(73) Assignee: Teijin Seiki Co., Ltd., Minato-ku (JP)

( * ) Notice: Subject to any disclaimer, the term of this patent is extended or adjusted under 35 U.S.C. 154(b) by 0 days.

(21) Appl. No.: 10/316,384

(22) Filed: Dec. 10, 2002

(65) Prior Publication Data
US 2003/0115983 A1 Jun. 26, 2003

(30) Foreign Application Priority Data
Dec. 11, 2001 (JP) .......................... P2001-376965

(51) Int. Cl.⁷ .................................... F16H 33/10
(52) U.S. Cl. ............................. 74/640; 384/504
(58) Field of Search ..................... 74/640; 384/504

(56) References Cited

U.S. PATENT DOCUMENTS

| | | | |
|---|---|---|---|
| 2,906,143 A | | 9/1959 | Musser |
| 2,932,986 A | * | 4/1960 | Musser ................ 74/665 K |
| 3,091,979 A | | 6/1963 | Schaefer, Jr. et al. |
| 3,196,713 A | | 7/1965 | Robinson |
| 3,492,887 A | * | 2/1970 | Ellinger ................ 74/450 |
| 4,501,216 A | * | 2/1985 | Voslamber ............ 114/39.13 |
| 4,840,090 A | * | 6/1989 | Iwata ..................... 74/640 |
| 4,909,098 A | * | 3/1990 | Kiryu ..................... 74/640 |
| 5,687,620 A | * | 11/1997 | Ishikawa ............... 74/640 |
| 5,720,101 A | | 2/1998 | Foley et al. |
| 6,167,783 B1 | * | 1/2001 | Ishikawa ............... 74/640 |

FOREIGN PATENT DOCUMENTS

| | | | |
|---|---|---|---|
| DE | 100 24 905 A1 | 11/2001 | |
| EP | 0 822 356 A1 | 2/1998 | |
| JP | 59113342 A | * 6/1984 | ............ F16H/1/32 |
| JP | 61-173851 U | 10/1986 | |
| JP | 03004054 A | * 1/1991 | ............ F16H/1/32 |
| JP | 05141485 A | * 6/1993 | ............ F16H/1/32 |
| JP | 6-17888 A | 1/1994 | |

* cited by examiner

Primary Examiner—Rodney H. Bonck
Assistant Examiner—David D. Le
(74) Attorney, Agent, or Firm—Akin Gump Strauss Hauer & Feld, LLP

(57) ABSTRACT

A flex spline 1 used for a meshing type gear device includes an attachment portion 1a, a thin-thickness tubular portion 1b continuing to the attachment portion and capable of being elastically deformed, and external teeth 1c formed at the tip end portion of the tubular portion away from the attachment portion. The thin-thickness tubular portion 1b is formed in a conical shape with an opening angle θ which is tapered in a direction from the attachment portion 1a toward the external teeth 1c before inserting a wave generator 3.

10 Claims, 4 Drawing Sheets

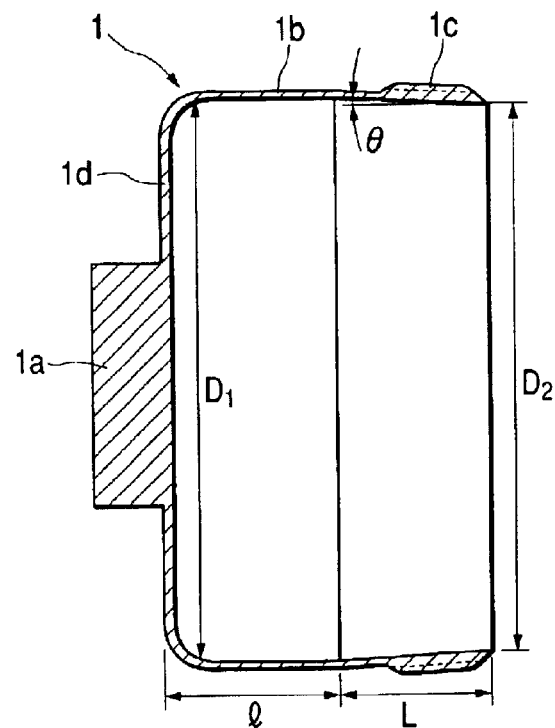
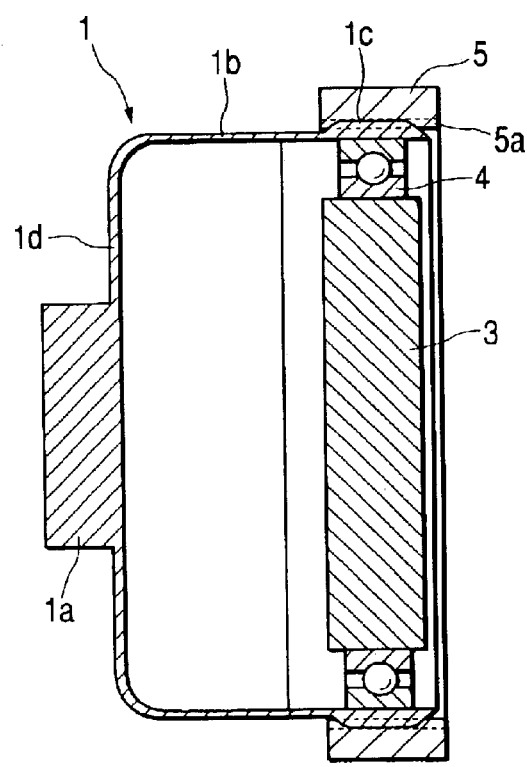
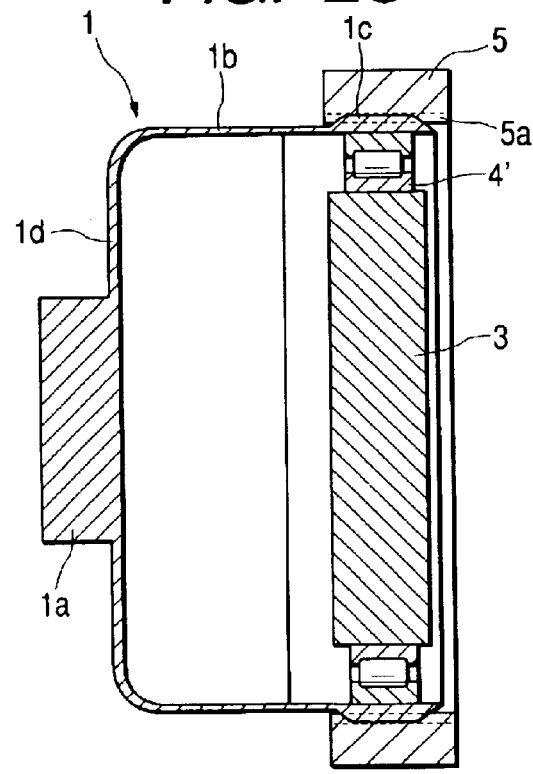

PRIOR ART

US 6,912,930 B2

FLEX SPLINE FOR MESHING TYPE GEAR DEVICE, AND MESHING TYPE GEAR DEVICE HAVING FLEX SPLINE

BACKGROUND OF THE INVENTION

The present invention relates to a flex spline used for a meshing type gear device (wave motion gear device) and the meshing type gear device (wave motion gear device) having the flex spline.

The meshing type gear device (wave motion gear device) is conventionally well known which includes a flex spline having an attachment portion formed normally as a boss portion and coupled to an output extraction member, a tubular portion with a thin thickness normally continuing to the attachment portion through a diaphragm and capable of being elastically deformed, and external teeth formed at the tip end portion of the tubular portion away from the attachment portion side; a circular spline having inner teeth which mesh with the external teeth of the flex spline and having the number of teeth slightly larger than that of the external teeth; and a wave generator which is formed in an elliptical shape and engages with the inner side of the tubular portion of the flex spline thereby to flexibly deform the flex spline. In particular, the meshing type gear device called Harmonic Drive (trade name) is well known.

At the time of processing the inner cylinder of the flex spline 1, normally, both the teeth portion 1c of the flex spline 1 and the attachment portion (boss portion) 1a thereof on the opposite side are grasped by a chuck of a lathe etc., and a bite and the flex spline are relatively moved in the shaft line direction while both the tooth portion and the attachment portion are rotated around the shaft lines thereof thereby to perform the cutting process thereof.

To this end, in the conventional flex spline 1, as shown in FIG. 4A, the tubular portion 1b with a thin thickness is formed in a straight cylindrical shape. That is, as shown in FIG. 4A, the inner diameter d1 on the attachment portion (boss portion) 1a side is equal to the inner diameter d2 on the thin-thickness tubular portion 1b side, that is, d1=d2. Each of the inner diameter d1 and the inner diameter d2 is set to be smaller than the pitch diameter d0 of the inner teeth 5a of a circular spline 5 described later.

In such a conventional meshing type gear device (wave motion gear device), usually, the attachment portion (boss portion) 1a is configured to be hardly deformed in order to fix the flex spline 1 and extracting an output torque. On the other hand, in the conventional meshing type gear device, as shown in Japanese Patent Laid-Open No. 17888/1994 and Japanese Utility Model Laid-Open No. 173851/1986, the teeth portion 1c of the flex spline 1 is formed on the thin-thickness tubular portion 1b and the teeth portion 1c on the outer side of the flex spline 1 can be meshed with the teeth portion 5a of the circular spline 5.

The wave generator 3 having a cam formed in an elliptical shape is inserted-through a bearing 4 into the inner diameter portion at the tip end of the tubular portion 1b of the flex spline 1. The tooth portion 1c on the outer side of the flex spline 1 meshes with the circular spline 5 in a manner that the flex spline 1 is deformed by the wave generator 3, and the radius position of the tooth portion 1c of the flex spline 1 at which the major axis of the ellipse of the wave generator 3 is positioned is made positioned on the outer side from the radius position before the deformation.

As described above, the tubular portion 1b of the flex spline 1 is formed in the straight cylindrical shape. Thus, in the flex spline 1 where the wave generator 3 is inserted into the inner diameter portion of the tubular portion, the attachment portion 1a does not deform. In contrast, since the teeth portion 1c of the thin-thickness tubular portion 1b is expanded outwardly as shown in FIG. 4B by means of the wave generator 3, the tooth trace of the flex spline 1 having been deformed does not become in parallel to the tooth trace of the circular spline 5, so that a coning angle α is formed at the teeth portion.

Thus, the meshing depth between the external teeth 1c of the flex spline 1 and the inner teeth 5a of the circular spline 5 differs in the tooth-width direction (that is, the shaft line direction of the flex spline 1). Since the meshing depth differs in the tooth-width direction, the load is not applied uniformly over the entire width of the tooth but applied to a portion of the tooth concentrically. Usually, although each of the external teeth 1c of the flex spline 1 and the inner teeth 5a of the circular spline 5 is a spur tooth, a normal meshing state can not be obtained between these spur external teeth 1c and 5a.

Further, due to the influence of the aforesaid coning angle α of the flex spline 1, the wave generator 3 is made in contact only on its one end side with the inner diameter portion of the flex spline 1 when viewed along the shaft line direction of the flex spline 1. Thus, the life time of the bearing 4 attached between the wave generator 3 and the flex spline 1 is reduced and the meshing rigidity between the wave generator 3 and the flex spline 1 is also degraded.

Furthermore, even if a roller bearing with a large bearing capacity is tried to be attached between the wave generator 3 and the flex spline 1, due to the aforesaid coning angle α and the one end side contact state of the wave generator caused by the coning angle, the roller of the roller bearing inclines and so the inner wheel and the outer wheel of the bearing are abraded or worn out by the shoulder portion of the roller. Thus, such a rolling bearing can be not be applied.

The shorter the length (the length along the axial direction) of the body portion of the flex spline 1 becomes, the more the aforesaid various problems accompanied by the conventional technique become remarkable.

SUMMARY OF THE INVENTION

Accordingly, an object of the invention is to eliminate the problems accompanied by the conventional technique and to provide a flex spline for a meshing type gear device (wave motion gear device) in which the coning angle α formed between the flex spline 1 and the circular spline 5 is eliminated or reduced thereby to make the meshing depth between the external teeth 1c of the flex spline 1 and the inner teeth 5a of the circular spline 5 uniform in the tooth-width direction, whereby a load is uniformly applied over the entire width of the tooth and so a normal meshing state is obtained thereby to improve torque transmission accuracy, torsional rigidity and load ability.

Further, an object of the invention is to provide a meshing type gear device (wave motion gear device) having such a flex spline 1.

The aforesaid object is attained by a flex spline used for a meshing type gear device which includes an attachment portion, a thin-thickness tubular portion continuing to the attachment portion and capable of being elastically deformed, and external teeth formed at a tip end portion of the tubular portion away from the attachment portion side, wherein the flex spline used for a meshing type gear device is characterized in that the thin-thickness tubular portion is formed in a conical shape which is tapered from the attachment portion side toward the external teeth side.

That is, according to the invention, a maximum coning angle α which will be caused when the wave generator is inserted is analyzed by taking the rigidity and deformation of the entirety of the flex spline. Then, a conical shape having a tapered angle slightly smaller than the coning angle in the opposite direction of the coning angle is employed as the configuration of the flex spline in a free state. Thus, the coning angle α at the teeth of the flex spline is canceled by the tapered angle thereby to eliminate or reduce the coning angle between the flex spline and the circular spline in the meshed state.

In this case, the thin-thickness tubular portion of the flex spline according to the invention may be formed in the conical shape which is tapered uniformly toward the external teeth side from the attachment portion side. Alternatively, the tubular portion of the flex spline of the invention may be formed in a cylindrical shape over a predetermined length in the shaft line direction on the attachment portion side, and formed in a conical shape at the external teeth side portion continuing from the cylindrical portion so as to be tapered toward the external teeth side.

The attachment portion of the invention is in many cases coupled to an output extracting member. Thus, when the flex spline is configured in a cap shape, the attachment portion may be a projection portion formed as a boss portion at the bottom portion (diaphragm) of the cap. In some case, the flex spline is configured in a tubular shape having no bottom portion. In this case, the attachment portion may be formed as a ring portion on the opposite side of the tooth portion of the tubular portion.

Further, the invention provides a meshed type gear device having such a flex spline. That is, the meshing type gear device includes a flex spline having an attachment portion, a thin-thickness tubular portion continuing to the attachment portion and capable of being elastically deformed, and external teeth formed at a tip end portion of the tubular portion away from the attachment portion side; a circular spline having inner teeth to be meshed with the external teeth of the flex spline; and a wave generator elastically deforming the flex spline, wherein the meshing type gear device is characterized in that the thin-thickness tubular portion is formed in a conical shape which is tapered from the attachment portion side toward the external teeth side, and the wave generator is provided with a plural lines of bearings abutting against an inner periphery of the flex spline. Alternatively, the thin-thickness tubular portion is formed in a conical shape which is tapered from the attachment portion side toward the external teeth side, and the wave generator is provided with a roller bearing abutting against an inner periphery of the flex spline.

In these cases, also the thin-thickness tubular portion of the flex spline may be formed in the conical shape which is tapered uniformly toward the external teeth side from the attachment portion side. Alternatively, the tubular portion of the flex spline may be formed in a cylindrical shape on the attachment portion side, and formed in a conical shape at the external teeth side portion continuing from the cylindrical portion so as to be tapered toward the external teeth side The present disclosure relates to the subject matter contained in Japanese patent application No. P2001-376965 (filed on Dec. 11, 2001), which is expressly incorporated herein by reference in its entirety.

BRIEF DESCRIPTION OF THE DRAWINGS

FIGS. 1A to 1C are diagrams showing a first embodiment of the invention, in which FIG. 1A shows a sectional diagram of a cap-shaped flex spline which is tapered toward the tip end thereof, FIG. 1B shows a sectional view of one embodiment of a meshing type gear device (wave motion gear device) having a flex spline shown in FIG. 1A, and FIG. 1C shows a sectional view of another embodiment of a meshing type gear device (wave motion gear device) having a flex spline shown in FIG. 1A.

FIGS. 2A to 2C are diagrams showing a second embodiment of the invention, in which FIG. 2A shows a sectional diagram of a cap-shaped flex spline which is formed in a cylindrical shape over a predetermined length in the shaft line direction at an attachment portion side and is formed at an external teeth side portion continuing from the cylindrical which is tapered toward the external teeth thereof, FIG. 2B shows a sectional view of one embodiment of a meshing type gear device (wave motion gear device) having a flex spline shown in FIG. 2A, and FIG. 2C shows a sectional view of another embodiment of a meshing type gear device (wave motion gear device) having a flex spline shown in FIG. 2A.

FIGS. 3A and 3B are diagrams showing another embodiment of the invention, in which FIG. 3A shows a sectional diagram of a flex spline formed in a cylindrical shape having no bottom portion and formed in a conical shape being tapered toward the tip end, and FIG. 3B shows a sectional view of a meshing type gear device (wave motion gear device) having a flex spline shown in FIG. 3A.

FIGS. 4A and 4B are diagrams showing an example of a conventional device, in which FIG. 4A shows a sectional diagram of a flex spline and FIG. 4B shows a sectional view of a meshing type gear device (wave motion gear device) having a flex spline shown in FIG. 4A.

DESCRIPTION OF THE PREFERRED EMBODIMENT

Figure 1A:
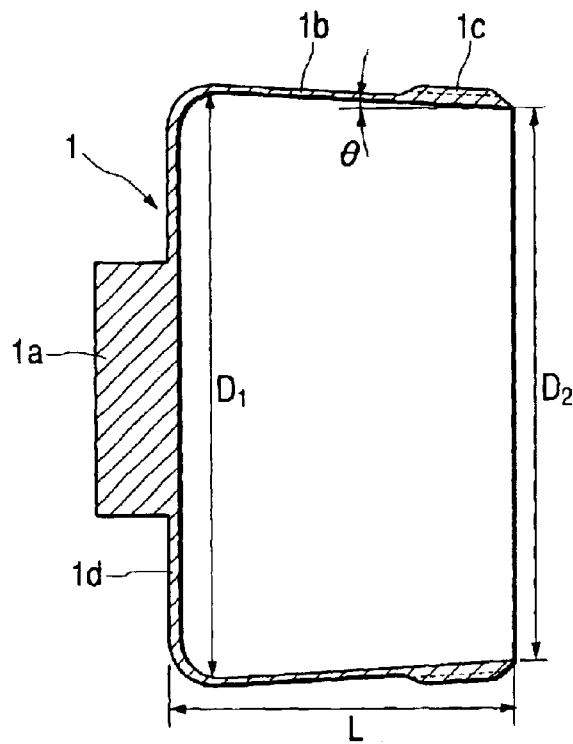

The embodiments of the invention will be explained in detail with reference to the accompanying drawings. FIG. 1A shows a sectional view of the first embodiment of a flex spline 1 according to the invention.

The flex spline 1 is formed by special steel with high fatigue strength. The flex spline 1 according to the embodiment shown in FIG. 1A is configured in a cap shape with a bottom portion, and a boss portion protruding from the bottom portion (diaphragm) 1d of the cap serves as an attachment portion 1a of the invention.

A tubular portion 1b with a thin thickness is continued to the attachment portion 1a through the bottom portion (diaphragm) 1d and external teeth 1c is formed at the outside of the tip end of the tubular portion 1b. In this embodiment, the tubular portion 1b is formed in a conical shape which is tapered uniformly toward the external teeth 1c side from the attachment portion 1a side.

That is, as shown in FIG. 1A, the inner diameter D1 on the attachment portion (boss portion) 1a side of the tubular portion is 1b of the flex spline 1 is larger than the inner diameter D2 on the tip end side thereof, that is, D1>D2.

Before inserting a wave generator 3, the flex spline 1 is formed in a conical shape with an angle θ by taking an assumed opening angle of the flex spline at the time of inserting the major axis of the wave generator 3 into consideration. This angle θ formed in advance is preferably an intermediate value of the opening angle as represented by the following expression.

$$\theta = [\tan^{-1}\{(\delta/2)/L\}]/2$$

In this expression, δ/2 is a half (one side) of a deviation value δ at the major axis portion at the time of inserting the wave generator 3, and L is the length of the body portion of the flex spline. The angle θ can be set freely in a range of about 0.5 to 5 degrees.

Before inserting the wave generator 3, the inner diameter D1 on the attachment portion (boss portion) 1a side of the tubular portion 1b of the flex spline 1 may be set to be larger than or equal to the inner diameter d1 on the attachment portion (boss portion) 1a side of the conventional flex spline. In the latter case, the pitch circle of the external teeth 1c of the flex spline 1 is made larger. Further, before inserting the wave generator 3, the inner diameter D1 on the attachment portion (boss portion) 1a side of the tubular portion 1b of the flex spline 1 is smaller than the diameter of the pitch circle of the inner teeth 5a of the circular spline 5.

Figure 1B:
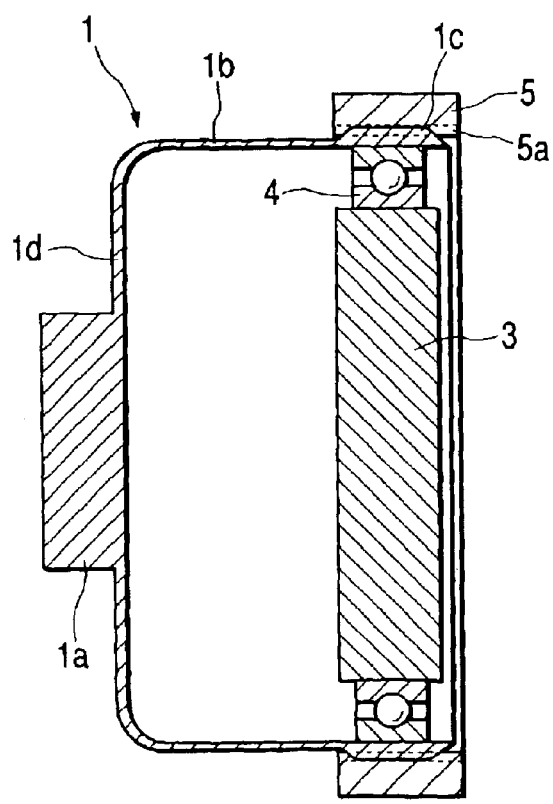

FIG. 1B shows a sectional view of the meshing type gear device (wave motion gear device) having the flex spline 1 shown in FIG. 1A.

The circular spline 5 formed in an annulus ring shape is fixedly provided on the outside of the tip end of the tubular portion 1b of the flex spline 1 such that the inner teeth 5a formed on the inner periphery of the circular spline 5 can mesh with the external teeth 1c of the flex spline 1. The number of teeth of the inner teeth 5a formed at the circular spline 5 is slightly larger than that of the external teeth 1c of the flex spline 1 (larger by 2 in the embodiment).

The wave generator 3 is provided so as to be rotatable on the inner side of the tip end of the tubular portion 1b of the flex spline 1. Normally, input is transmitted to the wave generator 3. The wave generator 3 is formed in an elliptical shape and has a cam. The inner ring of the bearing 4 is attached to the outer periphery of the cam of the wave generator 3 formed in the elliptical shape and the outer ring of the bearing 4 can engage with the inner side of the tubular portion of the flex spline 1.

When the wave generator 3 is inserted, the inner teeth 5a of the circular spline 5 mesh with the external teeth 1c of the flex spline 1 in a certain range, at the major axis portion. However, it is preferable that the pitch circle at the average meshing position is set to coincide with the pitch circle of the circular spline 5.

As described above, the wave generator 3 is configured by the cam formed in the elliptical shape and the bearing 4 which inner ring is attached to the cam and which outer ring engages with the inside of the tubular portion 1b of the flex spline 1. When input is transmitted to the wave generator 3, the wave generator flexibly deforms the flex spline 1 through the bearing 4. Further, as described above, the circular spline 5 has the inner teeth 5a meshing with the external teeth 1c of the flex spline 1, and the number of teeth of the inner teeth 5a is set to be slightly larger than that of the external teeth 1c of the flex spline (usually larger by 2).

When input is transmitted to the wave generator 3, the flex spline 1 is deflected in an elliptical shape by the wave generator 3, whereby the external teeth 1c of the major axis portion of the flex spline 1 thus deflected in the elliptical shape mesh with the inner teeth 5a of the circular spline 5 and the external teeth 1c of the minor axis portion completely separate from the inner teeth 5a of the circular spline. Since the circular spline 5 is fixed in the aforesaid manner, when the wave generator 3 is rotated in one direction (for example, clockwise), the flex spline 1 deforms elastically and the meshing position between the external teeth 1c of the flex spline 1 and the inner teeth 5a of the circular spline 5 moves sequentially. When the wave generator 3 rotates by 180 degrees clockwise, the flex spline 1 moves counterclockwise by a distance corresponding to one tooth. In this manner, when the wave generator 3 rotates by one revolution (360 degrees) clockwise, the flex spline 1 moves counterclockwise by a distance corresponding to two teeth since the flex spline 1 is smaller in its number of the teeth by two than that of the circular spline 5. In this manner, the input transmitted to the wave generator 3 is reduced in its speed to a large extent and taken out from the flex spline 1.

As described above, since the tubular portion 1b of the conventional flex spline 1 is formed in the straight cylindrical shape, the coning angle α is formed. Thus, the meshing depth between the external teeth 1c of the flex spline 1 and the inner teeth 5a of the circular spline 5 differs in the tooth-width direction (that is, the shaft line direction of the flex spline 1). Since the meshing depth differs in the tooth-width direction in this manner, the load is not applied uniformly over the entire width of the tooth but applied to a portion of the tooth concentrically. Thus, there arise a problem that although each of the external teeth 1c of the flex spline 1 and the inner teeth 5a of the circular spline 5 is a spur tooth usually, a normal meshing state can not be obtained between these spur external teeth 1c and 5a.

In order to solve such a problem accompanied by the conventional technique, according to the invention, a maximum coning angle α which will be caused when the wave generator 3 is inserted is analyzed by taking the rigidity and deformation of the entirety of the flex spline 1. Then, as shown in FIG. 1A, a conical shape having a tapered angle θ almost same as the aforesaid coning angle α in the opposite direction of the coning angle α is employed as the configuration of the flex spline 1 in a free state. Thus, the coning angle α at the teeth of the flex spline is canceled by the tapered angle θ thereby to eliminate or reduce the coning angle α between the flex spline 1 and the circular spline 5 in the meshed state.

According to the invention, the coning angle α formed between the flex spline 1 and the circular spline 5 is eliminated or reduced. Thus, as shown in FIG. 1B, the meshing depth between the tooth 1c of the flex spline 1 and the tooth 5a of the circular spline 5 becomes uniform in the tooth-width direction. As a result, a load is applied uniformly over the entire width of each of the teeth of the flex spline and the circular spline, so that a normal meshing state can be obtained and hence the meshing type gear device (wave motion gear device) can be provided in which torque transmission accuracy, torsional rigidity and load ability is improved.

Figure 1C:
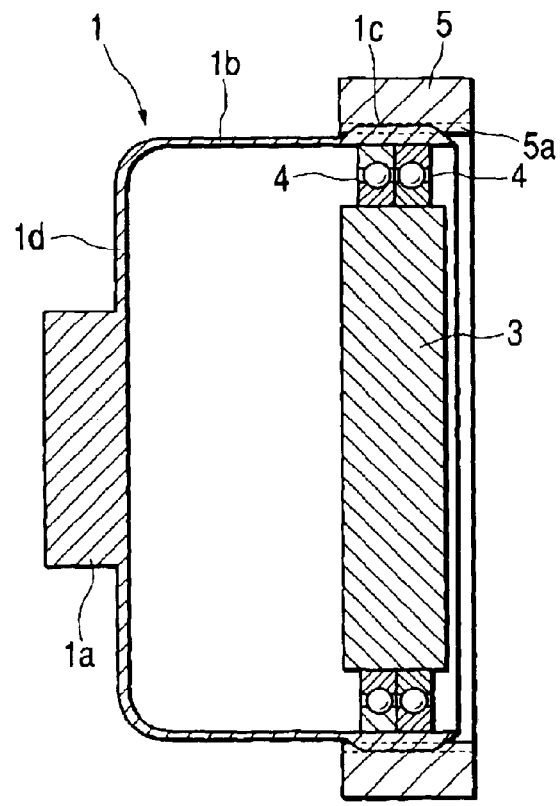

Further, according to the invention, since the tooth 1c of the flex spline 1 meshes with the tooth 5a of the circular spline 5 with the uniform meshing depth in the tooth-width direction, a plural lines of the bearings 4, 4 (two lines in the illustrated embodiment) abutting against the inner periphery of the flex spline 1 can be attached to the outer periphery of the cam of the wave generator 3, as shown in FIG. 1C. In such a case, a load can also be applied uniformly to each of the bearings 4, 4 and so a normal meshing state can be obtained.

FIG. 2A shows a sectional view of a flex spline 1 according to the second embodiment of the invention. The thin-thickness tubular portion 1b of the flex spline 1 according to the first embodiment is formed in the conical shape which is tapered uniformly toward the external teeth 1c side from the attachment portion 1a side. Alternatively, the flex spline 1 of the second embodiment shown in FIG. 2A is formed in a cylindrical shape (inner diameter is D1) over a predetermined length 1 in the shaft line direction on an attachment portion 1a side, and formed in a conical shape at the external teeth side portion 1b continuing from the cylindrical portion so as to be tapered toward the external teeth side (inner diameter of the tip end portion is D2). The size of the flex spline 1 according to this embodiment is set like the aforesaid embodiment. In this embodiment, the length L of the body portion of the flex spline 1 is the length of a portion formed in the conical shape. Thus, in this embodiment, the angle θ formed in advance is slightly larger than that of the aforesaid embodiment.

In the same manner as FIG. 1B, the meshing type gear device (wave motion gear device) having the flex spline 1 of the second embodiment can be obtained by using the flex spline 1 of the second embodiment shown in FIG. 2A (see FIG. 2B). The input transmitted to the wave generator 3 is reduced in its speed to a large extent and taken out from the flex spline 1.

Like the aforesaid embodiment, according to this embodiment, the coning angle α formed between the flex spline 1 and the circular spline 5 is eliminated or reduced. Thus, as shown in FIG. 2B, the meshing depth between the tooth 1c of the flex spline 1 and the tooth 5a of the circular spline 5 becomes uniform in the tooth-width direction. As a result, a load is applied uniformly over the entire width of each of the teeth of the flex spline and the circular spline, so that a normal meshing state can be obtained and hence the meshing type gear device (wave motion gear device) can be provided in which torque transmission accuracy, torsional rigidity and load ability is improved.

Further, according to the invention, the tooth 1c of the flex spline 1 meshes with the tooth 5a of the circular spline 5 with the uniform meshing depth in the tooth-width direction. Thus, like the embodiment shown in FIG. 1C, a plural lines of the bearings 4 (two lines in the illustrated embodiment) abutting against the inner periphery of the flex spline 1 may be attached to the outer periphery of the cam of the wave generator 3 so that a load is applied uniformly to each of the bearings thereby to obtain a normal meshing state.

Further, as shown in FIG. 2C, a roller bearing 4' abutting against the inner periphery of the flex spline 1 may be attached to the outer periphery of the cam of the wave generator 3 in place of the plural lines of the bearings 4, 4. The meshing depth between the tooth 1c of the flex spline 1 and the tooth 5a of the circular spline 5 becomes uniform in the tooth-width direction. As a result, a load is applied uniformly over the entire width of each of the teeth of the flex spline and the circular spline, so that a normal meshing state can be obtained. Thus, even in the case of employing the roller bearing 4', none of the inner wheel or the outer wheel of the bearing are abraded or worn out by the shoulder portion of the roller of the roller bearing 4' and hence the meshing type gear device (wave motion gear device) can be provided in which torque transmission accuracy, torsional rigidity and load ability is improved.

In the aforesaid embodiment shown in FIG. 1C, the roller bearing 4' may also be used in place of the plural lines of the bearings 4, 4.

Figure 3A:
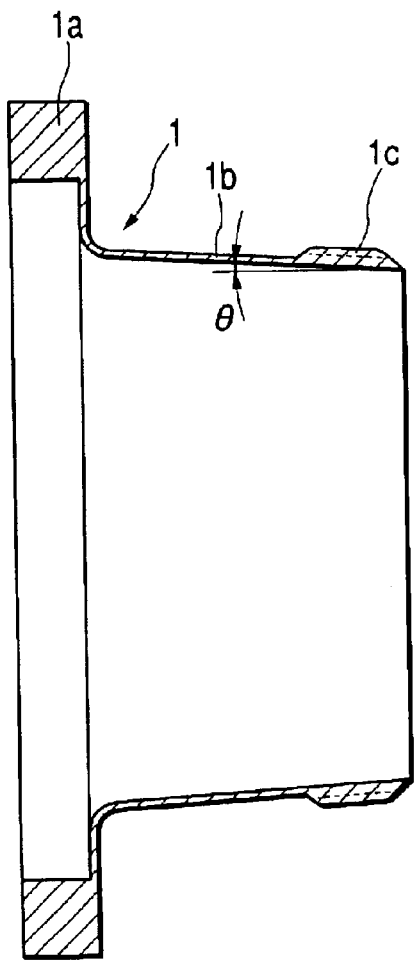
Figure 3B:
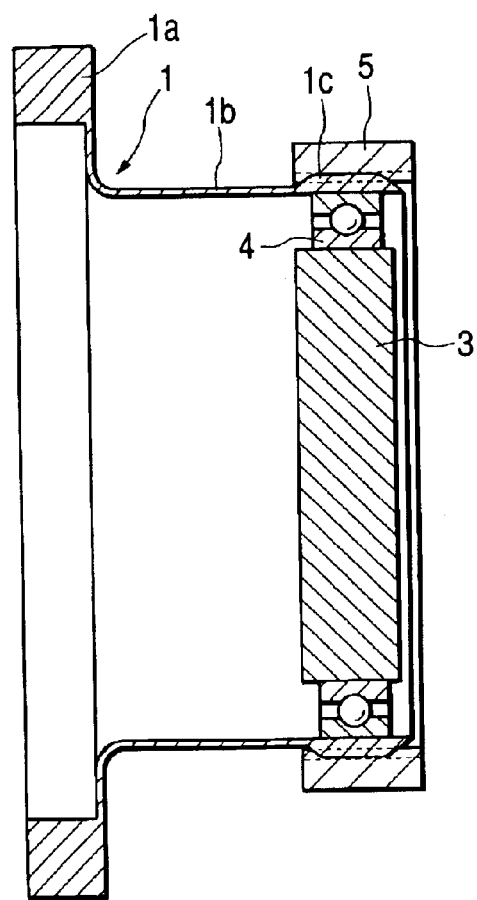
Figure 4A:
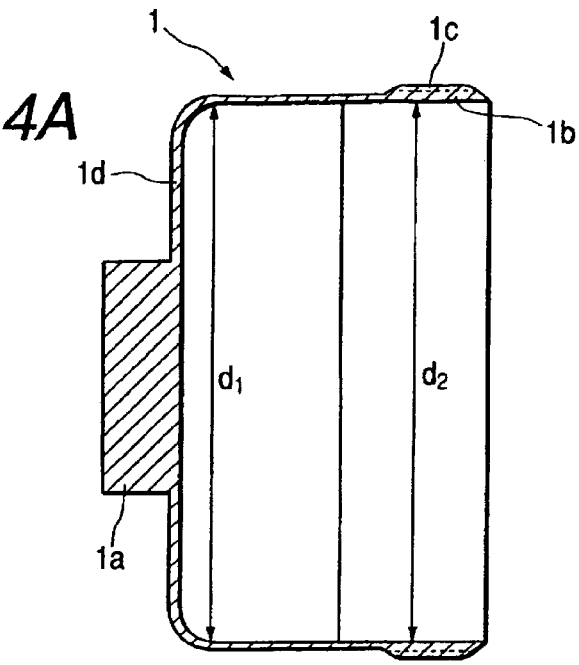
Figure 4B:
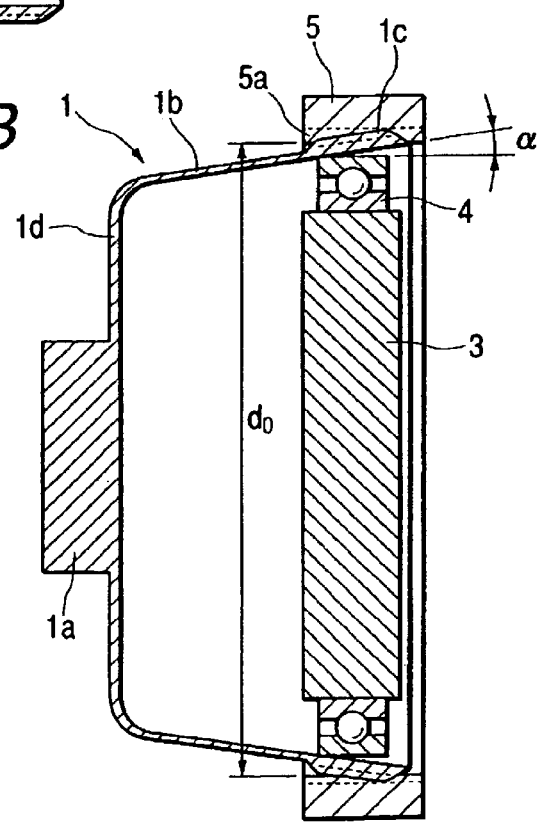

In the aforesaid first and second embodiments, the flex spline 1 is formed in the cap shape and the attachment portion 1a is the projection portion formed as the boss portion at the bottom portion of the cap. Alternatively, the invention can be applied to a case where the flex spline 1 is formed in a cylindrical shape having no bottom portion. In this case, as shown in FIGS. 3A and 3B, the attachment portion 1a is formed as an annular ring portion at the outer periphery of the end portion on the opposite side of the tooth portion 1c of the tubular portion 1b. FIG. 3A is a sectional view of the flex spline 1 of a cylindrical shape having no bottom portion formed in a conical shape which is tapered uniformly toward an external teeth side. FIG. 3B is a sectional view of the meshing type gear device (wave motion gear device) having the flex spline 1 shown in FIG. 3A.

As described above, according to the invention, the problem accompanied by the aforesaid conventional technique is eliminated. That is, the coning angle α formed between the flex spline 1 and the circular spline 5 is eliminated or reduced. Thus, the meshing depth between the tooth 1c of the flex spline 1 and the tooth 5a of the circular spline 5 becomes uniform in the tooth-width direction. As a result, a load can be applied uniformly over the entire width of each of the teeth of the flex spline and the circular spline, so that a normal meshing state can be obtained and hence the flex spline 1 for the meshing type gear device (wave motion gear device) can be provided in which torque transmission accuracy, torsional rigidity and load ability is improved.

Further, according to the invention, the meshing type gear device (wave motion gear device) having such the flex spline 1 can be provided.

What is claimed is:

1. A flex spline used for a meshing type gear device, comprising:
    an attachment portion;
    a thin-thickness tubular portion continuing to the attachment portion and capable of being elastically deformed; and
    external teeth formed at a tip end portion of the tubular portion away from the attachment portion,
    wherein the thin-thickness tubular portion is formed at least partly in a conical shape which is tapered in a direction from the attachment portion toward the external teeth when in a relaxed, undeformed state.

2. A flex spline used for a meshing type gear device according to claim 1, wherein the thin-thickness tubular portion has an attachment portion side part in a straight cylindrical shape, and an external teeth side part in the conical shape, which continues from the cylindrical attachment portion side part.

3. A meshing type gear device comprising:
    a flex spline having an attachment portion, a thin-thickness tubular portion continuing to the attachment portion and capable of being elastically deformed, and external teeth formed at a tip end portion of the tubular portion away from the attachment portion;
    a circular spline having inner teeth to be meshed with the external teeth of the flex spline; and
    a wave generator elastically deforming the flex spline,
    wherein the thin-thickness tubular portion is formed at least partly in a conical shape which is tapered in a direction from the attachment portion toward the external teeth when in a relaxed, undeformed state, and
    wherein the wave generator has plural lines of bearings abutting against an inner periphery of the flex spline.

4. The meshing type gear device of claim 3 wherein an attachment portion side of the thin-thickness tubular portion has an inner diameter that is greater than or equal to a maximum meshing length of the wave generator, and a tip end portion side of the thin-thickness tubular portion has an inner diameter that is less than the maximum meshing length of the wave generator.

5. The meshing type gear device of claim 3 wherein the wave generator has a maximum meshing length substantially equal to an inner diameter of an attachment portion side of the thin-thickness tubular portion of the flex spline.

6. The meshing type gear device of claim 3 wherein the wave generator has a maximum meshing length less than or equal to an inner diameter of an attachment portion side of the thin-thickness tubular portion of the flex spline.

7. A meshing type gear device comprising:
- a flex spline having an attachment portion, a thin-thickness tubular portion continuing to the attachment portion and capable of being elastically deformed, and external teeth formed at a tip end portion of the tubular portion away from the attachment portion;
- a circular spline having inner teeth to be meshed with the external teeth of the flex spline; and
- a wave generator elastically deforming the flex spline,
- wherein the thin-thickness tubular portion is formed at least partly in a conical shape which is tapered in a direction from the attachment portion toward the external teeth when in a relaxed, undeformed state, and
- wherein the wave generator has a roller bearing abutting against an inner periphery of the flex spline.

8. The meshing type gear device of claim 7 wherein the wave generator has a maximum meshing length substantially equal to an inner diameter of an attachment portion side of the thin-thickness tubular portion of the flex spline.

9. The meshing type gear device of claim 7 wherein the wave generator has a maximum meshing length less than or equal to an inner diameter of an attachment portion side of the thin-thickness tubular portion of the flex spline.

10. The meshing type gear device of claim 7 wherein an attachment portion side of the thin-thickness tubular portion has an inner diameter that is greater than or equal to a maximum meshing length of the wave generator, and a tip end portion side of the thin-thickness tubular portion has an inner diameter that is less than the maximum meshing length of the wave generator.

* * * * *